(12) United States Patent
Stadtfeld et al.

(10) Patent No.: US 10,744,581 B2
(45) Date of Patent: Aug. 18, 2020

(54) POWER SKIVING PRESSURE ANGLE CORRECTION WITHOUT TOOL GEOMETRY CHANGE

(71) Applicant: THE GLEASON WORKS, Rochester, NY (US)

(72) Inventors: Hermann J. Stadtfeld, Webster, NY (US); Uwe Gaiser, Ostfildern (DE)

(73) Assignee: THE GLEASON WORKS, Rochester, NY (US)

( * ) Notice: Subject to any disclaimer, the term of this patent is extended or adjusted under 35 U.S.C. 154(b) by 13 days.

(21) Appl. No.: 16/325,744

(22) PCT Filed: Aug. 21, 2017

(86) PCT No.: PCT/US2017/047789
§ 371 (c)(1),
(2) Date: Feb. 15, 2019

(87) PCT Pub. No.: WO2018/039118
PCT Pub. Date: Mar. 1, 2018

(65) Prior Publication Data
US 2019/0201992 A1    Jul. 4, 2019

Related U.S. Application Data

(60) Provisional application No. 62/377,834, filed on Aug. 22, 2016.

(51) Int. Cl.
*B23F 5/16*    (2006.01)
*B23F 21/04*   (2006.01)
(Continued)

(52) U.S. Cl.
CPC ............ *B23F 5/163* (2013.01); *B23F 21/046* (2013.01); *B23F 21/066* (2013.01);
(Continued)

(58) Field of Classification Search
CPC ...... B23F 5/163; B23F 21/046; B23F 21/066; B23F 21/083; B23F 21/103; B23F 21/086; B23F 21/106
See application file for complete search history.

(56) References Cited

U.S. PATENT DOCUMENTS 1,392,361 A  * 10/1921 Sears ..................... B23F 21/106
                                                            407/28
8,950,301 B2 * 2/2015 Marx ...................... B23F 21/128
                                                            82/53
(Continued)

FOREIGN PATENT DOCUMENTS

EP    1314503 B1    1/2008

OTHER PUBLICATIONS

Crockett, J.C., "New Cutting Tool Developments in Gear Shaping Technology", Gear Technology, Jan.-Feb. 1993, pp. 14-21.
(Continued)

*Primary Examiner* — Alan Snyder
(74) *Attorney, Agent, or Firm* — Robert L. McDowell (57) ABSTRACT

Cutting blade pressure angle changes or corrections in power skiving cutters (20) can be realized without the need tor a tool geometry change. An axial shift (26) of the blade reference point (24) will shift the existing involute on the blade profiles (22, 23) into a different radial location. An accompanying shift (AR) of the reference involute profile (30) by approximately the same amount and in the same direction will re-establish the relationship between work gear and cutter. The resulting work gear geometry has the same radial location of the slots, with the same slot width and the same tooth thickness but with a changed pressure angle.

6 Claims, 7 Drawing Sheets

(51) Int. Cl.
*B23F 21/06* (2006.01)
*B23F 21/08* (2006.01)
*B23F 21/10* (2006.01)

(52) U.S. Cl.
CPC .......... *B23F 21/083* (2013.01); *B23F 21/103* (2013.01); *B23F 21/086* (2013.01); *B23F 21/106* (2013.01)

(56) References Cited

U.S. PATENT DOCUMENTS

| | | |
|---|---|---|
| 9,120,165 B2 * | 9/2015 | Marx ..................... B23F 5/163 |
| 2015/0063927 A1 | 3/2015 | Sjoo |
| 2016/0016242 A1 | 1/2016 | Stadtfeld et al. |
| 2016/0175950 A1 | 6/2016 | Stadtfeld et al. |

OTHER PUBLICATIONS

International Search Report and Written Opinion for PCT/US2017/047789, ISA/EPO, dated Nov 2, 2017, 11 pgs.

* cited by examiner

POWER SKIVING PRESSURE ANGLE CORRECTION WITHOUT TOOL GEOMETRY CHANGE

FIELD OF THE INVENTION

The invention is directed to manufacturing gears by the power skiving process and in particular to a method of adjusting or correcting the pressure angle of the cutting blades of a power skiving tool without the need to change the geometry of the blades.

BACKGROUND OF THE INVENTION

Figure 1:
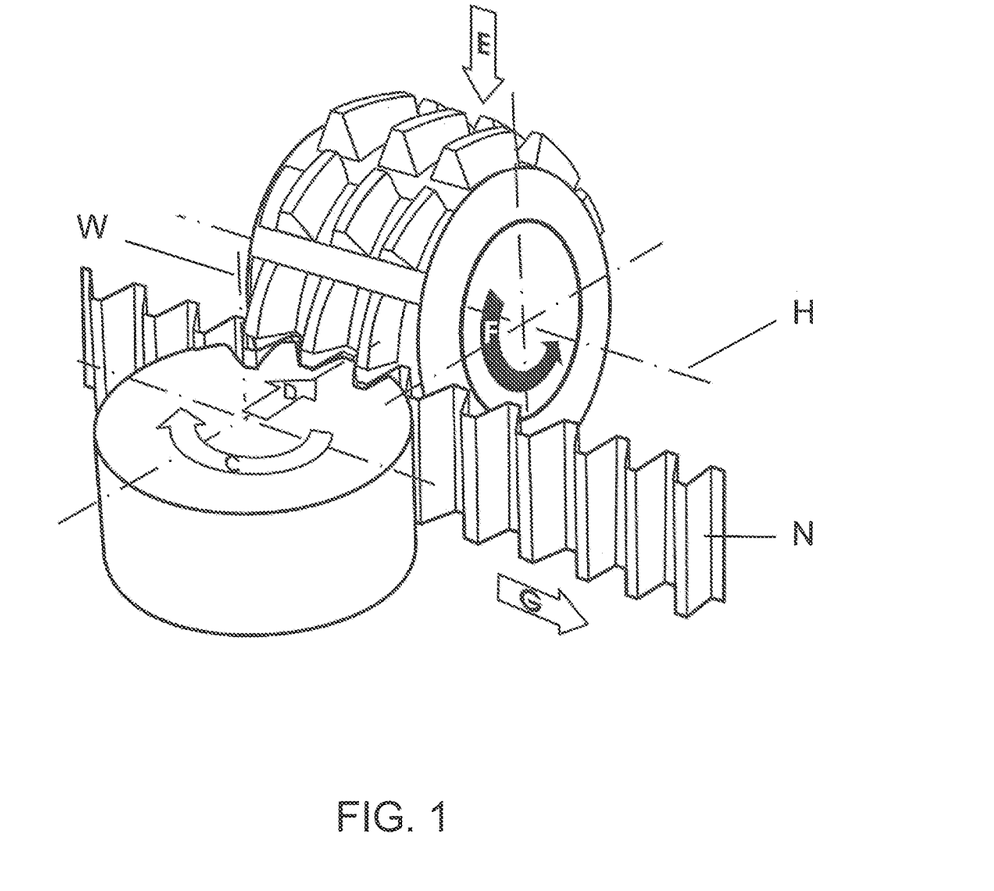
FIG. 1 shows a three dimensional graphic of a cylindrical hob, a virtual generating rack and a work gear.

Cylindrical hobs are used for the manufacture of external cylindrical gears, cross helical gears and worm gears. The manufacture of internal gears is not possible using a cylindrical hobbing tool due to mutilation left and right to the center line. The profile of a cylindrical hob is a trapezoid which reflects the pressure angle and module (depth and spacing) of the part to be manufactured. This so-called reference profile can be observed in a plane through the center of the hob in an axial plane (e.g. a horizontal plane) as illustrated by FIG. 1. The directions of the hob axis, H, and the workpiece axis, W, in the case of spur gear manufacturing are perpendicular to one another or slightly inclined about an angle, which is the same or similar magnitude as the lead angle of the hob teeth.

FIG. 1 shows a three dimensional graphic of a cylindrical hob and virtual generating rack. The hob simulates the profile of the generating rack in a horizontal plane (the drawing shows the top profile plane of the rack), which in the simple case shown in FIG. 1 contains the axis of rotation of the hob. If the hob rotates (as indicated by "F"), the generating rack will move in direction "G". In case of a hob with one start, one revolution will shift the rack one pitch in direction G. In order to cut a gear with the face width of the rack in FIG. 1, the hob has to move in direction "E", until the horizontal plane (which includes the hob axis) reaches the bottom profile plane of the rack. Thus, the hob teeth show the rack profile on their front face, if the front face coincides with an axial plane. Each hob revolution, which shifts the rack by one pitch, also requires the rotation of the work by one pitch (rotation C). In such a case all mayor cutting forces are tangential to the hob and directly translate into the torque which is required to rotate the hob.

In case of helical gears, the hob axis is inclined to the work axis by the value of the helix angle with the possible addition or subtraction of the hob lead angle (depending on the lead direction). One hob revolution (in case of a single start hob) requires a shift of the virtual generating rack, N, in direction "G" by one pitch. If, for example, an external cylindrical work gear is positioned on the opposite side of the rack than the hob, and if this work gear is "engaged" with the virtual generating rack, then the hob will cut involute teeth onto the work gear blank while it rotates (direction F). The work gear has to rotate one pitch during each hob revolution (one start hob). Because the generating rack has to shift in direction "G" while the hob rotates, the work gear will also have to rotate in direction "C" in order generate the involute profile and also in order to work its way around the work gear and cut all the teeth (slots) on the work gear circumference.

Figure 2:
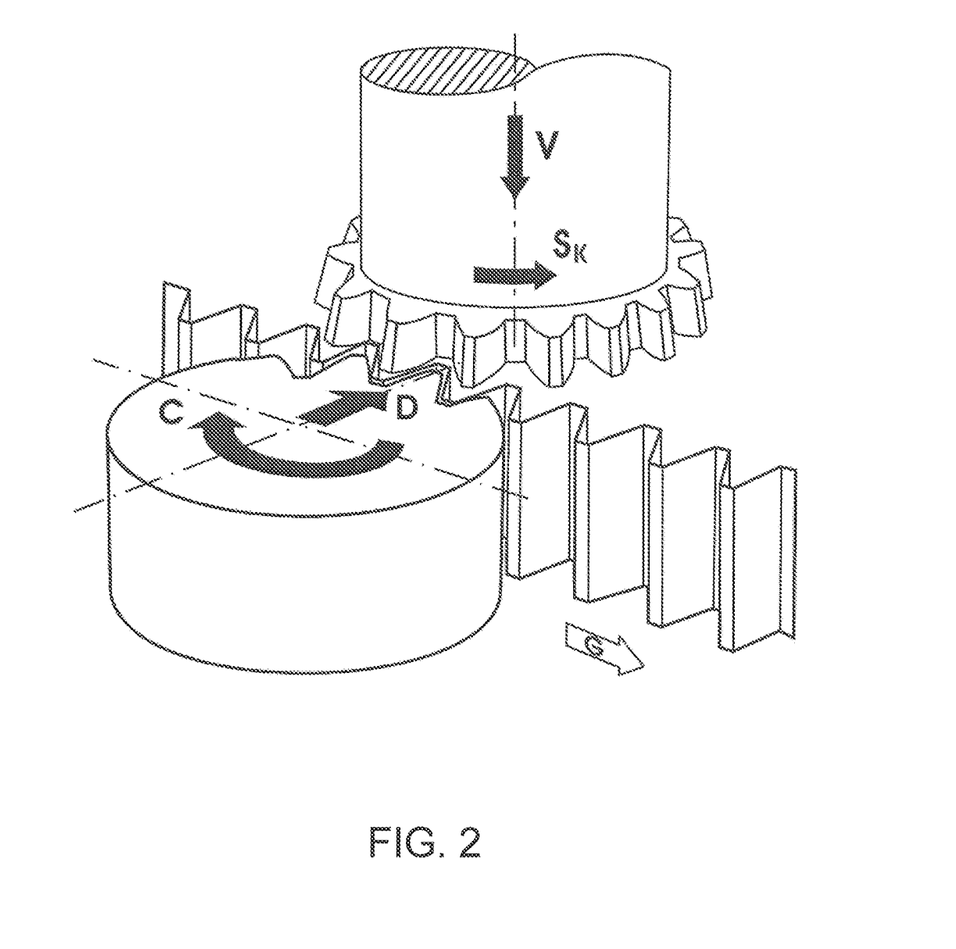
FIG. 2 shows a three dimensional graphic of a shaper cutter, a virtual generating rack and a work gear.

FIG. 2 shows a three dimensional graphic of a shaper cutter and a virtual generating rack. While the shaper cutter rotates (as indicated by Sk) around its axis, the generating rack shifts in direction "G" and the involute profile of the shaper cutter teeth will form the trapezoidal reference profile of the rack. Although the described cutter rotation and rack shift will form the profile of the rack, it will not provide any cutting action. The shaper cutter teeth have the involute profile which is required to form the straight profile of the rack teeth in a radial plane (perpendicular to the axis of the shaper cutter). The stroke motion "V" in the axial direction of the shaper cutter is required to introduce a cutting action and is also necessary to cut the face width of a gear. If the length of the stroke is equal to the width of the rack, then it is possible to cut a cylindrical gear with the same face width as shown left in FIG. 2. While the generating rack shifts in direction "G" e.g. by one pitch, the work which is engaged with the rack has to rotate also by one pitch (rotation C). In the case, shown in FIG. 2, all major cutting forces are directed in axial shaper cutter direction.

Shaping is a method where a cylindrical pinion-shaped cutter strokes axially (V in FIG. 2) while it is engaged with an external or internal work piece. Every forward stroke removes material while, simultaneously to the stroking, a continuous index rotation between shaper cutter and work piece is performed. While the shaper cutter rotates one pitch (rotation $S_k$) the generating rack shifts one pitch in direction "G" and the work gear rotates one pitch in rotational direction "C" (in FIG. 2). Every reverse stroke is unproductive which makes shaping a rather slow process. Shaping has its strength in the machining of internal gears (which is not possible with hobbing) or gears which allow no over-travel clearance behind the end of the teeth to be machined (also often not possible with hobbing).

Figure 3:
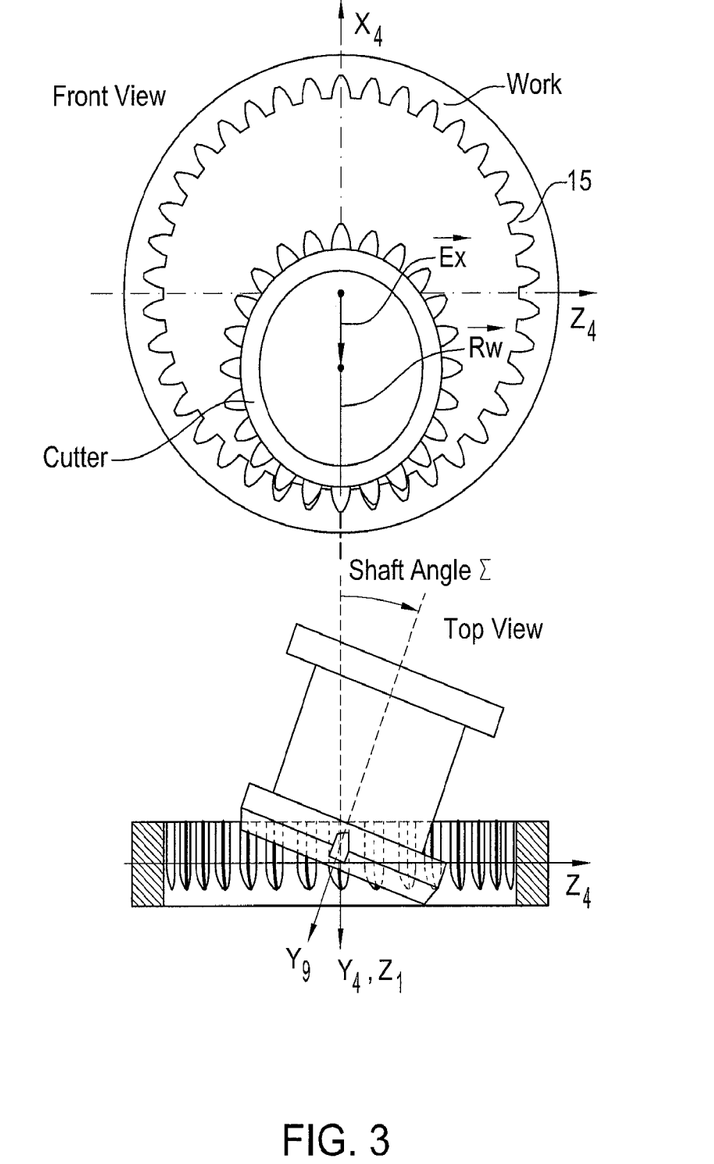
FIG. 3 shows front and top views of the orientation of a power skiving cutter and internal gear.

FIG. 3 shows the orientation of a Power skiving cutter and an internal gear, front and top view. While the cutter rotates the involute profiles of its teeth form the straight profiles of a virtual generating rack (not shown in FIG. 3). The rotation of the cutter shifts the generating rack sideways (like in FIG. 2). Covering the width of the generating rack teeth (equivalent with the face width of a cylindrical gear to be cut) requires a feed motion of the cutter in axial work gear direction (Y4, Z4).

In contrast to the shaper cutter in FIG. 2, the cutting action in power skiving is not generated by axial stroking but merely by the relative motion between skiving cutter and work gear (during the synchronized rotation of both) which is directed in lead direction of the work gear teeth. The relative motion is created with the inclination angle between work and cutter (see shaft angle Σ in FIG. 3). The cutting teeth are engaged in the slots of the work piece while cutter and work piece rotate and create the velocities $V_{tool}$ and $V_{work}$ as shown in FIG. 3. The difference between the two peripheral velocities is utilized as cutting velocity $V_{cut}$. Thus, the cutting velocity $V_{cut}$ is a function of the cutter RPM (or angular velocity $\omega_{tool}$) and the inclination angle Σ:

$$V_{cut} = \omega_{tool} \cdot \sin \Sigma$$

Figure 4:
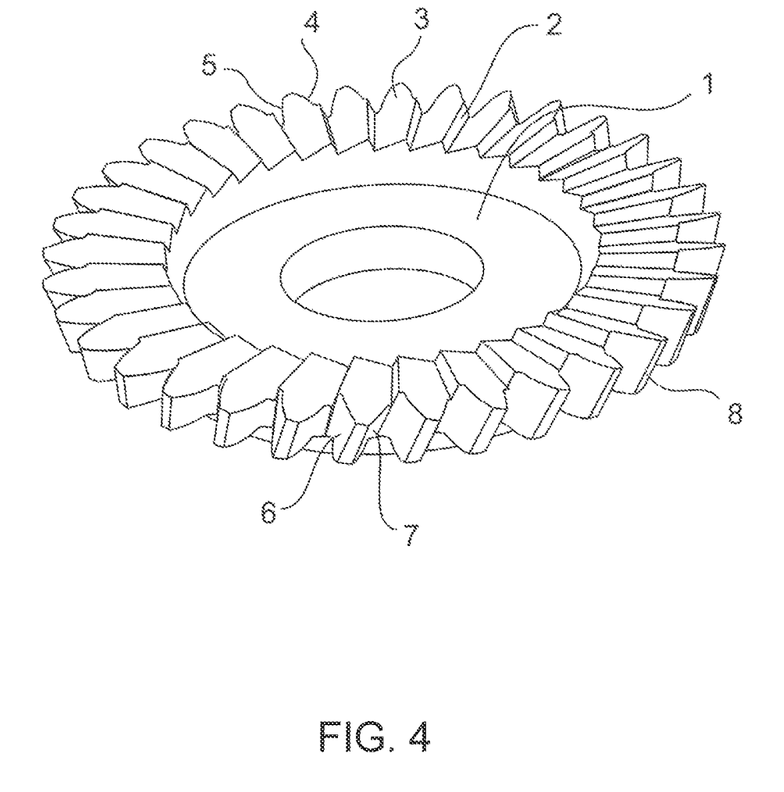
FIG. 4 shows a solid high speed steel power skiving cutter.

With power skiving, the tool has a complicated geometry which is determined and manufactured for one specific work gear geometry. A solid high speed steel cutter 1 as shown in FIG. 4 is the most common type of tool utilized in the power skiving process. The cutter disk 1 is manufactured for example from high speed steel material. The cutter disk 1 has a plurality of cutting teeth (or blades) 2 which have a front face 3, two cutting edges 4 and 5, two side relief surfaces 6 and 7 behind the cutting edges 4 and 5 as well as a top relief surface 8.

Correction methods for pressure angle changes are known in the state of the art if such a tool produces teeth with a pressure angle error. Such correction methods include:

A. Re-grind the all the teeth (blades) 2 of cutter disk with a corrected pressure angle.

B. Three dimensional cutter inclinations which utilize a projection of the profile of the tool front face 3 in the cutting process instead of the real front face profile 3.

Method A is expensive and time consuming. There may be several weeks of turn-around time required in order to re-shape and re-coat the blade profiles 4 and 5 of the cutter disk 1. In most cases, such a re-working is not even possible because the corrected profile would require altering the diameter and/or the thickness of the disk 1. A diameter change will cause additional tooth profile distortion of the manufactured work gear 15 and therefore is not permissible. Changing the thickness of the cutter disk 1 is in most cases not possible because the side relief behind the front face cutting profile (surfaces 6 and 7) reduces the thickness of the cutting teeth which will cause tooth thickness errors in the produced gears.

Method B can be applied within very small limits. Changing the three-dimensional orientation of the cutter disk (FIG. 3) might correct the pressure angle error but also will distort the involute profile which causes secondary profile errors in the produced work gears. The additional tool inclinations required for such a correction will also reduce or increase the technological blade angles such as side rake angle (surface 3), side relief angles (surfaces 6 and 7) and the top relief angle (surface 8) which might have an adverse effect to the tool life and the produced surface finish.

SUMMARY OF THE INVENTION

Cutting blade pressure angle changes and/or corrections in power skiving cutters can be realized without the need for a tool geometry change. An axial shift of the blade reference point will shift the existing involute on the blade profiles into a different radial location. An accompanying shift of the reference involute profile by the same amount and in the same direction will re-establish the relationship between work gear and cutter. The resulting work gear geometry has the same radial location of the slots, with the same slot width and the same tooth thickness but with a changed pressure angle.

In particular, the inventive method comprises changing the pressure angle of the teeth of a gear produced by power skiving with a cutting tool having a periphery and a plurality of stick-shaped cutting blades located about the periphery of the cutting tool. The method includes providing a cutting tool having an initial radial position of the cutting blades and providing a first gear having an initial pressure angle, a radial location of tooth slots, a tooth slot width and a tooth thickness. The first gear (which may be a theoretical reference gear) is formed by power skiving with the tool having the initial radial position of cutting blades with the power skiving being carried out at a first center distance between the first gear and the cutting tool. The initial radial position of the cutting blades is changed by an amount (Y) to an adjusted radial position and the first center distance between said first gear and said cutting tool is changed by an amount ($\Delta R$) to an adjusted center distance. A second gear (utilizing a workpiece blank identical to the workpiece blank of the first gear) is formed by power skiving with the tool having the adjusted radial position of cutting blades with the power skiving being carried out at the adjusted center distance between the second gear and the cutting tool. The second gear comprises teeth having a pressure angle different than the initial pressure angle of the first gear with the second gear having a radial location of tooth slots, a tooth slot width and a tooth thickness the same as the first gear.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

Figure 5:
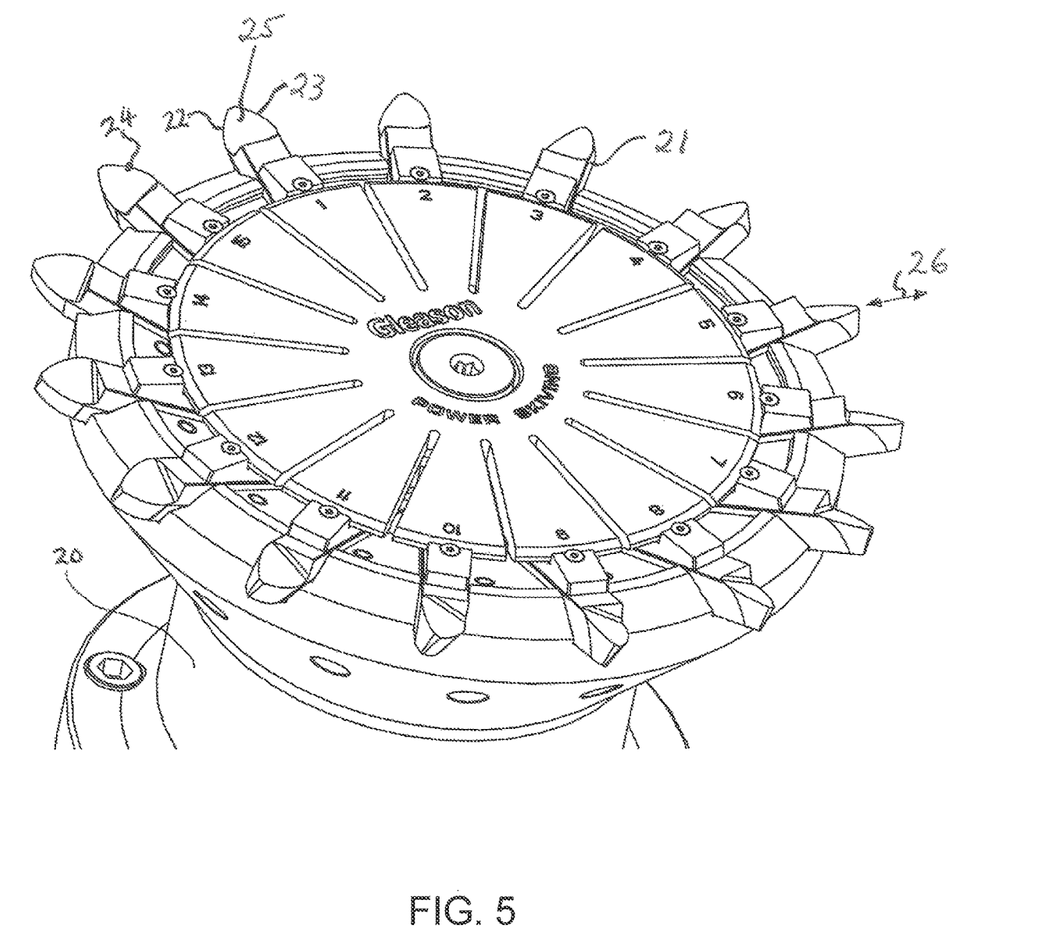
FIG. 5 shows a peripheral stick blade cutter.

FIG. 5 illustrates a recent type of peripheral cutting tool 20 (e.g. US 2016/0175950) utilizing individual blade sticks 21 as a cutting tool for processes including the power skiving process. Each blade stick 21 has a front face 25 and two cutting edges 22 and 23 as well as a calculation point or pitch point 24. The cutting edge profiles 22 and 23 of the stick blades 21 are formed in order to duplicate or approximate the involute profile of the comparable solid cutter 1

(e.g. FIG. 4). The pitch diameter of the assembled blades is adjusted by the axial location of the blade calculation point or pitch point 24. The pitch diameter in the peripheral stick blade cutter 20 duplicates the pitch diameter of the equivalent solid cutter 1 (2*Rw in FIG. 3) in order to assure that the peripheral stick blade cutter 20 produces the same work piece geometry as the comparable solid disk cutter 1. In order to position the pitch point 24 in the correct radial location, the blade sticks can be shifted in direction 26 which is in the lengthwise orientation direction of the stick blade 21.

Figure 6:
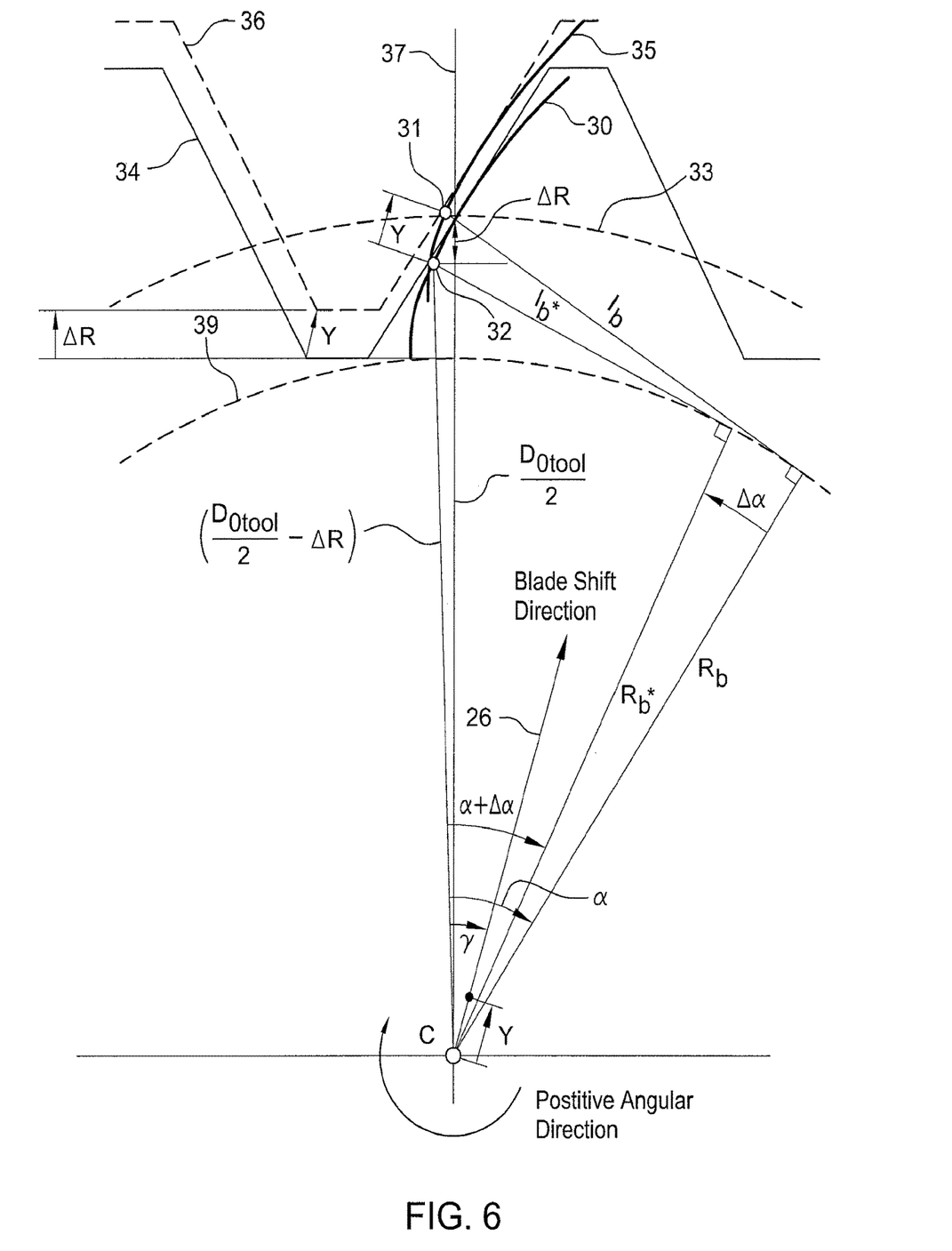
FIG. 6 shows the reference profile and one involute of a cutting blade before and after a corrective radial shift.

FIG. 6 shows the reference profile 34 and the involute 30 generated by the reference profile 34, respectively by unrolling the virtual cord $I^*_b$ from the base circle 39. The involute triangle $I^*_b \rightarrow R^*_b \rightarrow (D_{Otool}/2 - \Delta R)$ enables the determination of the pressure angle at point 32 with: $\alpha + \Delta\alpha = \arccos[R^*_b*(D_{Otool}/2 - \Delta R)]$.

The inventors have discovered that an axial shift of the blade reference point 24 (FIG. 5) will shift the existing involute on the blade profiles 22 and 23 into a different radial location. If a point 32 on the involute profile 30 is shifted together with the involute 30 in direction 26 by the amount Y into the position 31 (located on shifted involute 35), then the pressure angle of the involute 30 at point 32 will now be located at point 31 on involute 35. The reference profile 34 is shifted by the same amount Y (approximately equivalent to the center distance adjustment $\Delta R$) and becomes profile 36. Because of the different involute triangle $I_b \rightarrow R_b \rightarrow D_{Otool}/2$, the correct pressure angle at point 31 would be $\alpha = \arccos[(R_b/(D_{Otool}/2)]$. In other words, the pressure angle change at point 31 is equal to $\Delta\alpha$ due to the fact that the existing involute on the blade was shifted to a larger radius. Blade point 32 manufactures on profile 34 the same flank point as blade point 31 on the center distance corrected profile 36. This is due to the shift of the existing blade profile to a larger radius (without re-developing the involute which it would require to manufacture the same original reference profile). Because of the fact that aforementioned applies to each point along the profile 36, not only the observed point 31, but the entire manufactured profile will change its pressure angle accordingly.

With the shift of the involute 30 to location 35, the reference profile 34 is also shifted in the same direction, by the same amount to location 36. The generating reference profile 34 has to be shifted in the same direction 26 by the same amount Y in order to re-establish a relationship between work gear 15 and cutter 20 which will create the same tooth thickness as well as the same tooth depth of the work gear 15 manufactured before said radial stick blade shift. The shift of the reference profile 34 to position 36 requires a center distance correction between cutting tool 20 and work gear 15 of an amount $\Delta R$. The resulting work gear geometry has the same radial location of the slots, with the same slot width and the same tooth thickness but has a pressure angle which changes by $\Delta\alpha$.

The center distance is the distance between two parallel axes or crossed axes gears. The center distance is the length of the line which connects the two axes and is perpendicular to each of them. It is also the shortest distance between the parallel or crossed axes. The center distance is calculated as the sum of the working pitch radii of two parallel axis gear members. In a gear manufacturing machine, the center distance is increased by moving the tool and the workpiece apart from each other.

As mentioned above, the pressure angle of the original involute location 30 at point 32, which is relevant for the work gear manufacture, can be calculated by:

$$\alpha + \Delta\alpha = \arccos[R_b*/(D_{Otool}/2 - \Delta R)] \quad (1)$$

Figure 7:
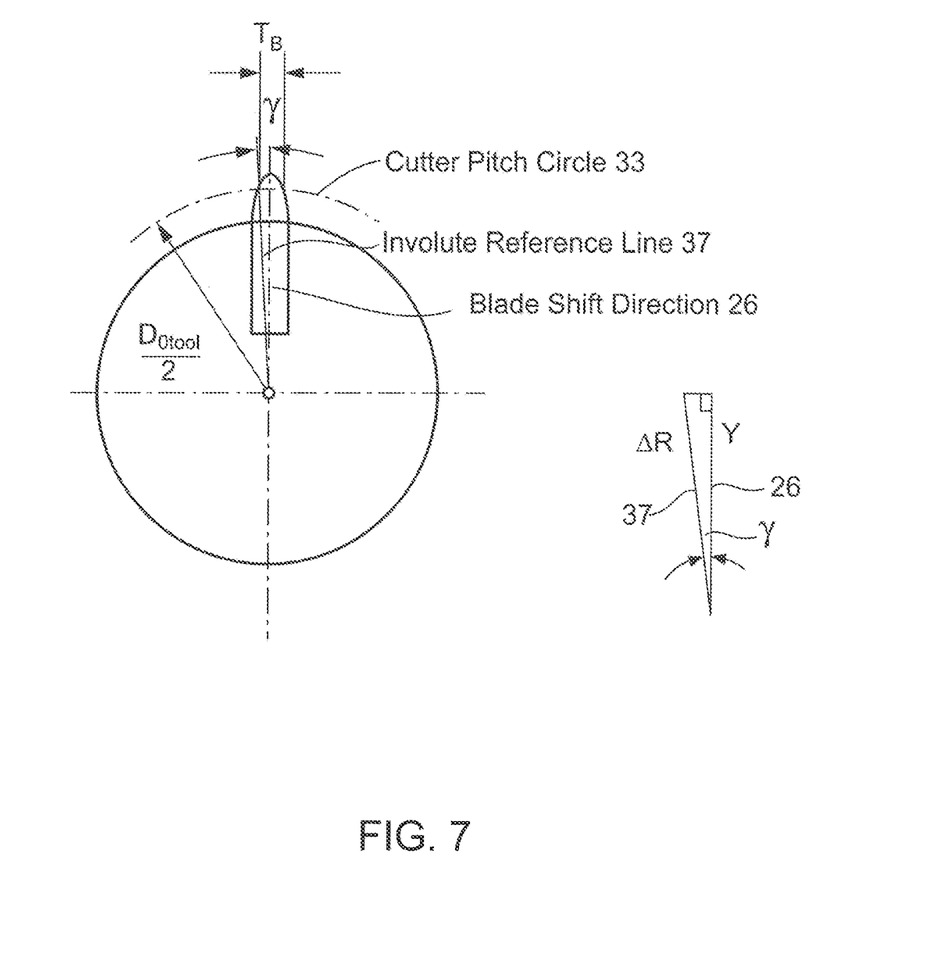
FIG. 7 shows the relationship between the radial direction and blade shift direction.

The pressure angle at point 31 on shifted involute 35 can be calculated by:

$$\alpha = \arccos[R_b/(D_{Otool}/2)] \quad (2)$$

where $R_b = R_b^*$ and
where $\Delta\alpha$ is the amount of pressure angle change or correction after the shift FIG. 7 shows the geometrical relationship for the calculation of the angle $\gamma$ between the radial shift direction 26 and the involute reference line direction 37. The blade thickness $T_B$ is calculated as arc length of a large circle 33 or as secant of a circle segment of $2\gamma$, dividing the circumference of the pitch circle (or reference circle) 33 in equal spaces of blade thickness and gap between two preceding blades, based on the theoretical number of teeth. The theoretical number of teeth is represented in the cutter 1 of FIG. 4. The angle $\gamma$ between radial blade shift direction and involute reference line is calculated according to Equation 4.

The angle between the shift direction and the radial direction is calculated from the relationships shown in FIG. 7.

The following formulas can be derived from the relationship in FIG. 7:

$$T_B = (\pi * D_{0Tool})/(2 * Z_{Tool})$$

$$\gamma = \arctan[(T_B/2)*(1/(D_{0Tool}/2))] \quad (3)$$

or $$\gamma = \arctan[\pi/(2*Z_{Tool})] \quad (4)$$

which delivers:

$$\Delta R = Y * \cos \gamma \quad (5)$$

In common cases, where $\gamma$ is equal to or smaller than 2°, equation (3) can be simplified to:

$$\Delta R \approx Y \quad (6)$$

where:
$T_B$=Blade thickness
$D_{0Tool}$=Cutter pitch circle
$Z_{Tool}$=Number of teeth (blades) of cutter
$\gamma$=Angle between blade shift direction and Involute reference line
Y=Blade shift amount along stick blade shank direction
$\Delta R$=Radial location change of involute The relationship between incremental radial blade position changes and the pressure angle correction is calculated as follows:

$$R_b = (D_{0Tool}/2) * \cos \alpha \quad (7)$$

or:

$$R_b = [(D_{0Tool}/2) - \Delta R] * \cos(\alpha + \Delta\alpha) \quad (8)$$

$$(D_{0Tool}/2)*\cos \alpha = [(D_{0Tool}/2) - \Delta R]*\cos(\alpha + \Delta\alpha) \quad (7) \rightarrow (8)$$

Solved for the pressure angle correction $\Delta\alpha$:

$$\Delta\alpha = \arccos[\cos \alpha * (1/(1 - 2*\Delta R/D_{0Tool}))] - \alpha \quad (9)$$

Solved for $\Delta R$, with the assumption of:

$$\Delta R \approx Y$$

$$\Delta R = D_{0Tool}/2 * [1 - \cos \alpha / \cos(\alpha + \Delta\alpha)] \quad (10)$$

where:
$R_b$=Involute base circle
$\alpha$=Pressure angle

Δα=Pressure angle correction

Example

Number of teeth work gear=69
Pitch diameter of work gear=175 mm
Pressure angle of work gear α=20°
Number of teeth cutter=35
Pitch diameter of cutter $D_{Otool}$=88.77 mm
Base radius of cutter $R_b=R^*_b$=(88.77 mm/2)*cos [20°] =41.708 mm
ΔR=0.25 mm $$\Delta\alpha=\arccos [R^*_b/(D_{Otool}/2-\Delta R)]-\arccos [R_b/(D_{Otool}/2)]$$

$$\Delta\alpha=\arccos [41.41 \text{ mm}/(44.385 \text{ mm}-0.25 \text{ mm})]-\arccos [41.708 \text{ mm}/44.385$$

$$\Delta\alpha=19.089°-20.000°=0.91°$$

The inventive method of correcting pressure angles avoids the requirement for blade profile regrinding (prior art Method A), which also would require a recoating. Regrinding and recoating is time consuming and expensive. The inventive method also avoids the three-dimensional cutter inclination according to prior art Method B. The side effects of Method B (changing the technological tool angles) are, in particular, not acceptable if those angles are optimized in order to achieve good tool life and good surface finish. Optimized technological blade angles are of special importance in a hard skiving process (hard finishing of soft machined and case hardened gears). In order to preserve the technological blade geometry, the inventive method is applicable. In the case of hard skiving, the inventive method presents a pressure angle change and/or correction method which maintains all technological blade angles without the requirement of regrinding and recoating the blade profiles.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of changing the pressure angle of the teeth of a gear produced by power skiving with a cutting tool having a periphery and a plurality of stick-shaped cutting blades located about the periphery of the cutting tool, said method comprising:
    providing said cutting tool having an initial radial position of said cutting blades,
    providing a first gear having an initial pressure angle, a radial location of tooth slots, a tooth slot width and a tooth thickness,
    said first gear being formed by power skiving with said tool having said initial radial position of cutting blades, said power skiving being carried out at a first center distance between said first gear and said cutting tool,
    changing said initial radial position of said cutting blades by an amount (Y) to an adjusted radial position,
    changing said first center distance between said first gear and said cutting tool by an amount (ΔR) to an adjusted center distance,
    forming a second gear by power skiving with said tool having said adjusted radial position of cutting blades, said power skiving being carried out at said adjusted center distance between said second gear and said cutting tool,
    wherein said second gear comprises teeth having a pressure angle different than said initial pressure angle of said first gear, said second gear having a radial location of tooth slots, a tooth slot width and a tooth thickness the same as said first gear.

2. The method of claim 1 wherein the center distance change (ΔR) is approximately equal to the change in radial position (Y).

3. The method of claim 1 wherein said power skiving comprises hard power skiving.

4. The method of claim 1 wherein changing said initial radial position of said cutting blades comprises shifting the position of each of said plurality of cutting blades in the lengthwise direction thereof.

5. The method of claim 1 wherein said first gear is a theoretical reference gear.

6. The method of claim 1 wherein said first gear is formed from a first workpiece blank and said second gear is formed from a second workpiece blank, and wherein said first and second workpiece blanks are identical.

* * * * *